April 14, 1925.
J. M. KOEHN
PIPE JACK
Filed Oct. 24, 1924
1,533,429
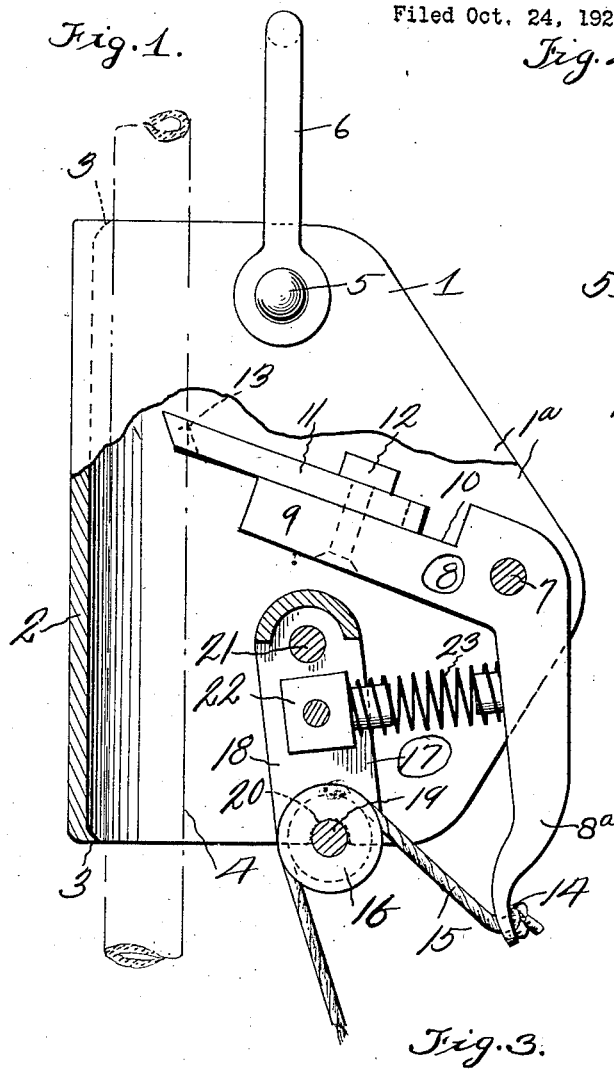
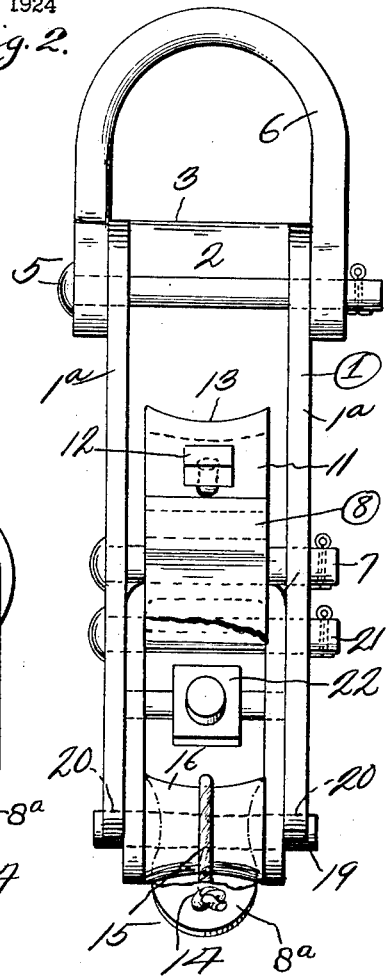
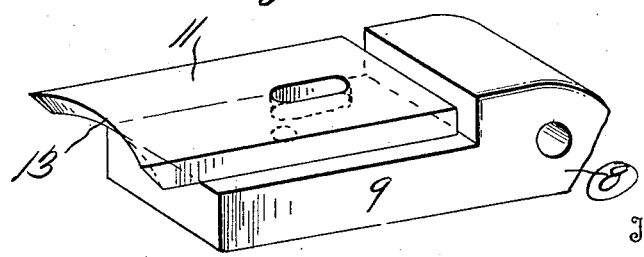
Inventor
J. M. Koehn
By D. Swift
Attorney Patented Apr. 14, 1925.

1,533,429

UNITED STATES PATENT OFFICE.

JOHN M. KOEHN, OF BUFFALO, NEBRASKA.

PIPE JACK.

Application filed October 24, 1924. Serial No. 745,670.

*To all whom it may concern:*

Be it known that I, JOHN M. KOEHN, a citizen of the United States, residing at Buffalo, in the county of Dawson, State of Nebraska, have invented a new and useful Pipe Jack; and I do hereby declare the following to be a full, clear, and exact description of the invention, such as will enable others skilled in the art to which it appertains to make and use the same.

The invention relates to pipe and rod jacks, and has for its object to provide a device of this character comprising a U-shaped frame horizontally disposed for the reception of a pipe or rod, inwardly extending teeth carried at the upper and lower ends of the U-shaped member and adapted to be engaged by the pipe or rod and a spring actuated gripping lever pivotally mounted in the U-shaped frame and adapted to engage a pipe or rod at a point between the gripping teeth of the frame. Also to provide the U-shaped frame with a shackle at its upper end to which any kind of hoisting mechanism may be attached.

A further object is to provide an elongated member within the U-shaped frame, and which elongated member supports one end of a coiled spring, the other end of which engages an arm of the gripping jaw lever.

A further object is to rotatably mount within the member disposed in the U-shaped frame a roller, over which roller a tripping line extends and is connected to the arm of the tripping lever. The roller is rotatably mounted on a transversely disposed pin extending through the member within the U-shaped frame and the ends of the pin disposed in recesses in the under side of the U-shaped frame, thereby allowing the device to be easily and quickly assembled or disassembled.

A further object is to provide the gripping lever with an adjustable gripping plate whereby the device may be adjusted for gripping pipes of different diameter.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the jack, showing the same partially in section.

Figure 2 is an end view of the jack.

Figure 3 is a perspective view of the adjustable plate and a portion of the gripping lever.

Referring to the drawing, the numeral 1 designates the frame of the device, which frame is U-shaped in horizontal cross section, and has its transverse connecting portion 2 at its upper and lower ends provided with inturned teeth 3, adapted to bite into one side of pipe 4 which is being pulled. Pivotally connected to the frame 1 at 5, adjacent its upper end, is a conventional form of shackle to which any kind of hoisting mechanism may be attached for imparting a pull on the device and pipe clamped therein.

Pivotally connected between the flanges 1$^a$ of the frame 1 adjacent their outer ends on a transversely disposed pin 7 is an angularly shaped trip lever 8. Lever 8 has its arm 9 inclining inwardly and upwardly and provided with a recess 10 in its upper side, in which is disposed an adjustable plate 11, which is held by the bolt 12. Adjustable plate 11 has its outer end provided with a sharp semicircular shaped recess 13, in which the outer side of the pipe 4 is received, and gripped by the biting of the plate therein. Angularly shaped trip lever 8 is provided with a downwardly extending arm 8$^a$, to the lower end of which is connected at 14 a cable 15. Cable 15 extends upwardly between the flanges 1$^a$ of the frame and over a pulley 16, and thence downwardly and may be of any length desired and is adapted to be grasped by the operator for releasing the trip lever and pipe after a hoisting operation and allowing the device to move downwardly on the pipe for obtaining a lower purchase thereon. Disposed between the flanges 1$^a$ of the frame 1 is a U-shaped member 17 between the arms 18 of which the pulley 16 is rotatably mounted on a transverse pin 19. Pin 19 extends beyond the outer sides of the arms 18 and has its end disposed in recesses 20 in the lower sides of the flanges 1$^a$, therefore it will be seen that the U-shaped member is rigidly held at its lower end and when the pin 21, which extends through the flanges 1ª and the U-shaped member 17, is in position, the U-shaped member 17 is rigidly held against movement. Interposed between the arm 8ª of the trip lever 18 and a pivoted block 22 mounted between the arms 18 of the U-shaped member 17 is an expansible coiled spring 23, which coiled spring cooperates with the arm 8ª in a manner whereby the gripping plate 11 is held in close and binding engagement with the outer side of the pipe 4, however by providing the cable 15 it is obvious the device may be easily and quickly released from time to time during a pipe or rod pulling operation. It will be seen by pivotally mounting the block 22 between the arms 18, when the arm 8ª assumes various positions, the block 22 will pivotally move in the same plane, thereby reducing the flexing or bending action on the coiled spring 23 to a minimum during its expansive action.

From the above it will be seen that a pipe and rod jack is provided, which is simple in construction, may be easily and quickly applied to a pipe, the parts reduced to a minimum, and constructed in a manner whereby the jack may be easily changed in position on the pipe during a pulling operation, and controllable by a cable which may lead to any suitable position.

The invention having been set forth what is claimed as new and useful is:—

1. The combination with a pipe and rod jack comprising a U-shaped frame in which a pipe is received, spaced teeth carried by the frame adjacent its upper and lower ends and adapted to bite into a pipe, an angularly shaped gripping lever pivoted within the frame, an adjustable gripping bar carried by said lever and adapted to engage the outer side of a pipe, of a U-shaped member rigidly disposed within the U-shaped frame, a pulley carried by said U-shaped member, a cable extending over said pulley and connected to the angularly shaped gripping member, and a coiled spring interposed between the gripping lever and the U-shaped member.

2. The combination with a pipe and rod jack comprising a U-shaped frame, an angularly disposed gripping lever pivotally mounted within the frame, a pipe gripping arm carried by said lever, a downwardly extending arm carried by said lever, of a U-shaped member disposed within the frame, a pin extending through said frame and the upper end of the U-shaped member, a pin extending through recesses in the bottom of the frame and the lower end of the U-shaped member, a pulley mounted on said last named pin, a block pivotally mounted within the U-shaped member, an expansible spring interposed between said block and the downwardly extending arm of the lever, and a cable connected to the lower end of the downwardly extending arm and extending upwardly and over the pulley.

In testimony whereof I have signed my name to this specification in the presence of two subscribing witnesses.

JOHN M. KOEHN.

Witnesses:
CHARLES B. DIEFENBACH,
MELVIN G. DIEFENBACH.